United States Patent
Greenwood et al.

[11] Patent Number: 5,842,171
[45] Date of Patent: Nov. 24, 1998

[54] AUDIO SIGNAL PROCESSOR

[75] Inventors: Jonathan Mark Greenwood; Michael John Ludgate, both of Basingstoke, United Kingdom

[73] Assignees: Sony Corporation, Tokyo, Japan; Sony United Kingdom Limited, Weybridge, England

[21] Appl. No.: 827,527

[22] Filed: Mar. 28, 1997

[30] Foreign Application Priority Data

Apr. 2, 1996 [GB] United Kingdom ............... 9606921

[51] Int. Cl.⁶ ........................................ H04L 7/00
[52] U.S. Cl. ........................................... 704/500
[58] Field of Search .................. 704/500; 386/100, 386/104, 98, 112, 96, 124; 360/32, 48, 27; 348/472, 512, 515; 369/48, 59, 93

[56] References Cited

U.S. PATENT DOCUMENTS

| | | | |
|---|---|---|---|
| 5,245,667 | 9/1993 | Lew | 381/94 |
| 5,351,092 | 9/1994 | Poinboeuf et al. | 348/512 |
| 5,483,538 | 1/1996 | Rainbolt | 370/100.1 |
| 5,485,199 | 1/1996 | Elkind et al. | 348/180 |
| 5,553,220 | 9/1996 | Keene | 395/154 |
| 5,677,858 | 10/1997 | Takeda et al. | 364/724.1 |

*Primary Examiner*—Richemond Dorvil
*Attorney, Agent, or Firm*—Frommer Lawrence & Haug, LLP; William S. Frommer

[57] ABSTRACT

Digital audio data occurs in groups of data samples spaced apart in time. The data rate in the groups is much greater than the audio data sampling rate. The audio data may be embedded in the horizontal blanking interval of a video signal as in SDI. The audio data is extracted (2) from the video signal and the samples stored in a FIFO (3). The FIFO (3) removes the spacing between the groups of samples. Sets of the samples are weighted and summed in a multiplier (4) and accumulator (5). Each set to be weighted and summed is displaced by a preset number of samples relative to the previous set to decimate the audio data.

5 Claims, 5 Drawing Sheets

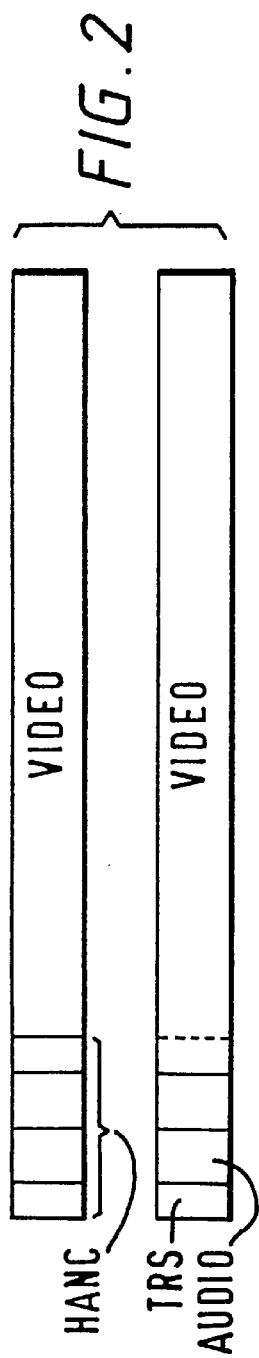
FIG. 2
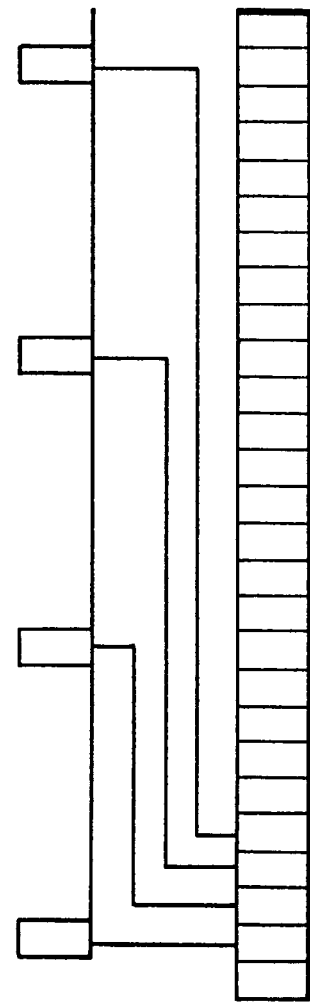
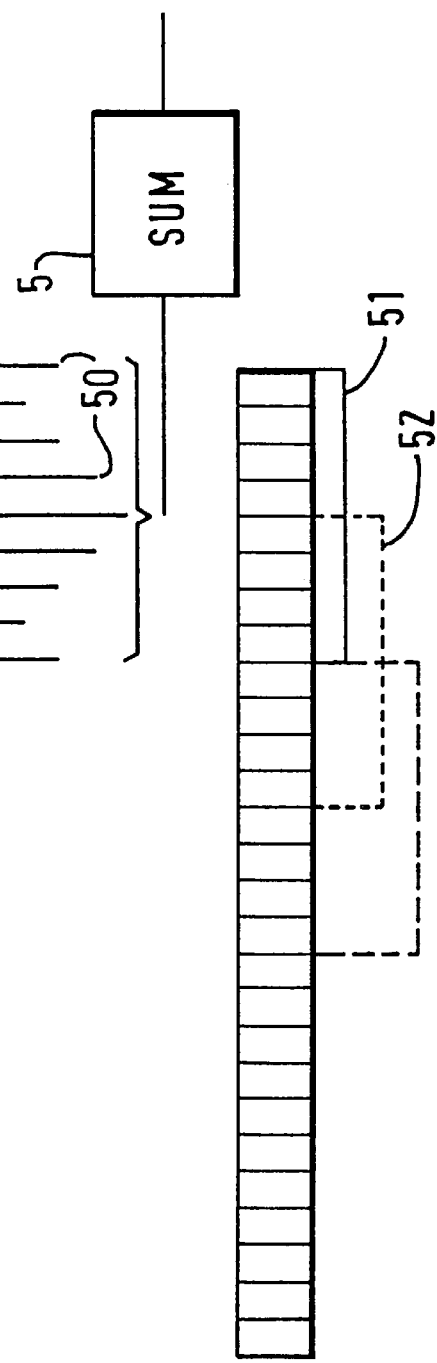
FIG. 3(A)
FIG. 3(B)
FIG. 3(C)

AUDIO SIGNAL PROCESSOR

BACKGROUND OF THE INVENTION

1. Field of the Invention

The present invention relates to an audio signal processor.

2. Description of the Prior Art

Audio data may be produced in a first format and need converting to a second format in which it can be used. For example, it is known to embed digital audio data in video data according to the SDI audio standard (Serial Digital Interconnect) defined by SMPTE: see SMPTE 272M: "Formatting AES/EBU Audio and Auxiliary Data into Digital Video Ancillary Data Space"—SMPTE Journal, April 1994. In SDI the digital audio data representing sampled at 48 KHz is formatted into packets in the horizontal blanking interval of a video signal.

The audio sample rate in the packets is the same as the video sample rate of 27 MHz (27M samples/s). The audio samples thus occur in packets in the horizontal blanking interval at a much higher data rate than is needed to represent the audio information.

To use the audio data is it necessary to extract the packets and to reduce the sample rate.

SUMMARY OF THE INVENTION

According to the present invention there is provided apparatus for processing digital audio data comprising a source of digital audio data representing audio data samples at an audio data sampling rate, the audio data samples being arranged in groups spaced in time, the data in a group having a data rate much greater than the audio sample rate, a store arranged to act as a first in first out store write control means for writing the samples of each group into the store at the said data rate as the group is produced by the source, read control means for reading sets of a predetermined number of successive samples from the store, the rate of production of the sets from the store being at the audio data sampling rate and, means for weighting the respective samples of each set and for summing the weighted samples of the set to produce filtered audio data at the audio data sampling rate each set of samples read out from the store being displaced by a preset number of samples relative to the previous set to decimate the audio data.

Thus the present invention makes use of the store to not only remove the spacings between packets and to reduce the data rate, but also to act as a linear delay line of a digital filter and decimator.

By filtering and decimating the audio data, the amount of audio data is reduced. Whilst the quality of the audio may be also reduced by the filtering and decimation process, reduced quality audio is acceptable in some circumstances.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 2 is a schematic timing diagram showing the general form of lines of SDI data;

FIGS. 3A, 3B, and 3C are schematic timing diagrams illustrating the operation of an audio data store and digital filter;

DESCRIPTION OF THE PREFERRED EMBODIMENTS

Figure 1:
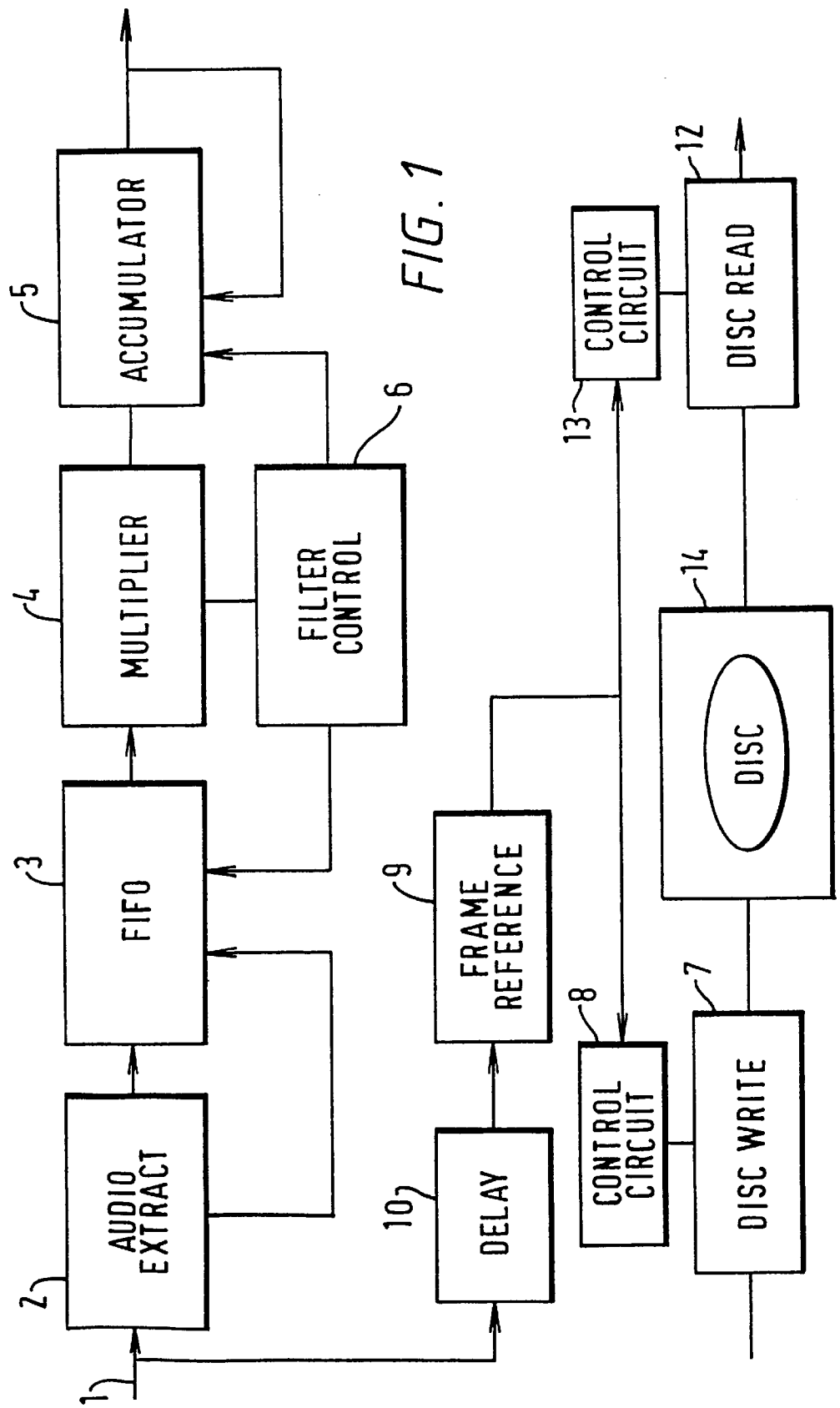
FIG. 1 is a block diagram of an audio signal processor in accordance with the invention; the processing including apparatus for storing the audio data produced.

Referring to FIGS. 1 and 2, the audio signal processor of FIG. 1 receives at input 1 SDI data having the general form shown in FIG. 2. The SDI data has a sample rate of for example 27M sample/second and comprises Horizontal Ancillary Data (HANC) and Active Component 4:2:2 Video Data. The HANC is placed in the horizontal blanking interval of a television line. In SDI, digital audio data forms part of the HANC. The digital audio data comprises 2 pairs of channels of 20 bit audio data each sampled at 48 KHz with the sample clock locked to the television signal. In the case of NTSC signals having 525 lines per television frame and a frame rate of 29.97 frames/second each channel has 8008 audio samples per 5 frames. There is a non-integer number (1601.6) of samples per frame for each audio channel.

The HANC at the beginning of each video line comprises a preamble indicating that audio data is present, the number of bits of audio data and the audio data with accompanying channel ID's. The HANC also includes TRS words which provide a frame reference signal.

For ease of the following explanation, it is assumed that the audio data represents only one audio channel with a data sampling rate of 48 KHz.

The SDI audio data consists of bursts of audio data bits occurring at 27M samples/sec. These bits are extracted by the Audio Extractor circuit 2 which also extracts a synchronisation signal associated with the audio data. The synchronisation signal is provided by the preamble. Under the control of the synchronisation signal, the audio data bits are written into a RAM 3 organised as a FIFO (First In First Out) store.

The audio data is written into the FIFO 3 at 27M samples/sec at spaced time intervals as shown in FIG. 3A. In the FIFO the audio samples are written into successive addresses as shown in FIG. 3B. The addresses are selected by a write pointer which selects the addresses of the FIFO successively.

The samples are read out to a filtering and decimation circuit 4, 5, 6. The samples to be read out are selected by a read pointer which selects addresses successively.

A group of g serially adjacent samples are read out of the FIFO and fed serially to a coefficient multiplier 4. Each sample of the group is multiplied by a weighting coefficient 50 shown schematically in FIG. 3B. For simplicity of illustration, FIG. 3B shows the samples in the RAM or FIFO with the weights applied simultaneously. Although that can be done, in actual practice of the present embodiment of the invention, the samples are read out serially and weighted serially. Each weighted sample of a group is fed to an accumulator 5 to be summed with the sum of the previous weighted samples in the group. The coefficients are produced by a filter control circuit 6 which also controls the read clock of the FIFO 3 and the accumulator 5. The control circuit resets the accumulator every g additions; i.e. after each group of g samples has been weighted and summed.

In one 48 KHz cycle period g multiplications and summations occur.

On the next 48 KHz cycle period another group 52 of g samples is serially readout of the FIFO. As shown in FIG. 3C this next group of g samples is displaced by h samples from the previous group. In this way decimation by a factor h is achieved: h is for example 4.

After decimation by the factor, h=4 if the single channel of audio samples are associated with NTSC video having 525 lines per frame at a frame rate of 29.97 frames per second, there are 2002 samples in 5 audio frames, resulting in 400.4 filtered samples per frame for one audio channel at a reduced sample rate of 12 KHz.

This results in a five frame sequence having 3 frames of 400 samples and 2 frames of 401 samples. This causes difficulties in storing data in a data store such as a Magneto-Optical disc because variable frame sizes have to be provided. In addition it would be necessary to identify the frames of each 5 frame sequence. Furthermore, if a sequence is edited, there are 4 cases out of five where the 5 frame sequence would be broken. To restore the sequence after an edit which breaks the sequence, samples would have to be added or dropped from the remaining audio frames.

Referring to FIG. 1, in the apparatus shown, the weighted audio samples are supplied to a write circuit 7. The write circuit is controlled by a control circuit 8 so that the samples are written into the circuit 7 synchronously with a video frame reference signal generated by a frame reference circuit 9. The circuit 9 is arranged to produce frame reference signals at the NTSC frame rate of about 29.97 per second in the absence of external synchronisation. External synchronisation is derived from the SDI at input 1 via a delay line 10 which compensates for the audio signal processing delay through the circuits 2, 3, 4 and 5. Because of the delay 10, the frames of samples produced by accumulator 5 occur synchronously with the frame reference signal. The samples are written into sequential addresses of the FIFO selected by a write pointer.

The control circuit 8 counts 400 samples from the occurrence of the frame reference signal and allows only these 400 samples to be written into the circuit 7 at the reduced sample rate of 12 KHz. If a 401st sample occurs in a frame, the control circuit 8 inhibits the write control associated with this sample 401st. The N frames of 400 audio samples are read out of the write circuit 7 time compressed. The time compressed audio samples are stored on a disc recorder via an SCSI interface. Time compression is used so the audio data rate matches the SCSI transfer rate and the data rate of other data which may be recorded on the disc.

To reproduce the audio samples from the disc the samples are read from the disc recorder by a read circuit 12 controlled by a control circuit 13. The control circuit 13 receives the frame reference signals from the frame reference signal generator 9. The frame reference signals occur at approximately the frame rate of 29.97 per second. The time compressed N frames of 400 audio samples are written into the read circuit from the disc and time expanded. The control circuit 13 causes a frame of 400 samples to be made available at the output of read circuit 12 at 12 KHz, synchronously with the frame reference signal. The result is that in some frames 400 samples are read out; in others 401 samples are read out, the additional sample being produced by reading the last sample in a frame twice.

Figure 4:
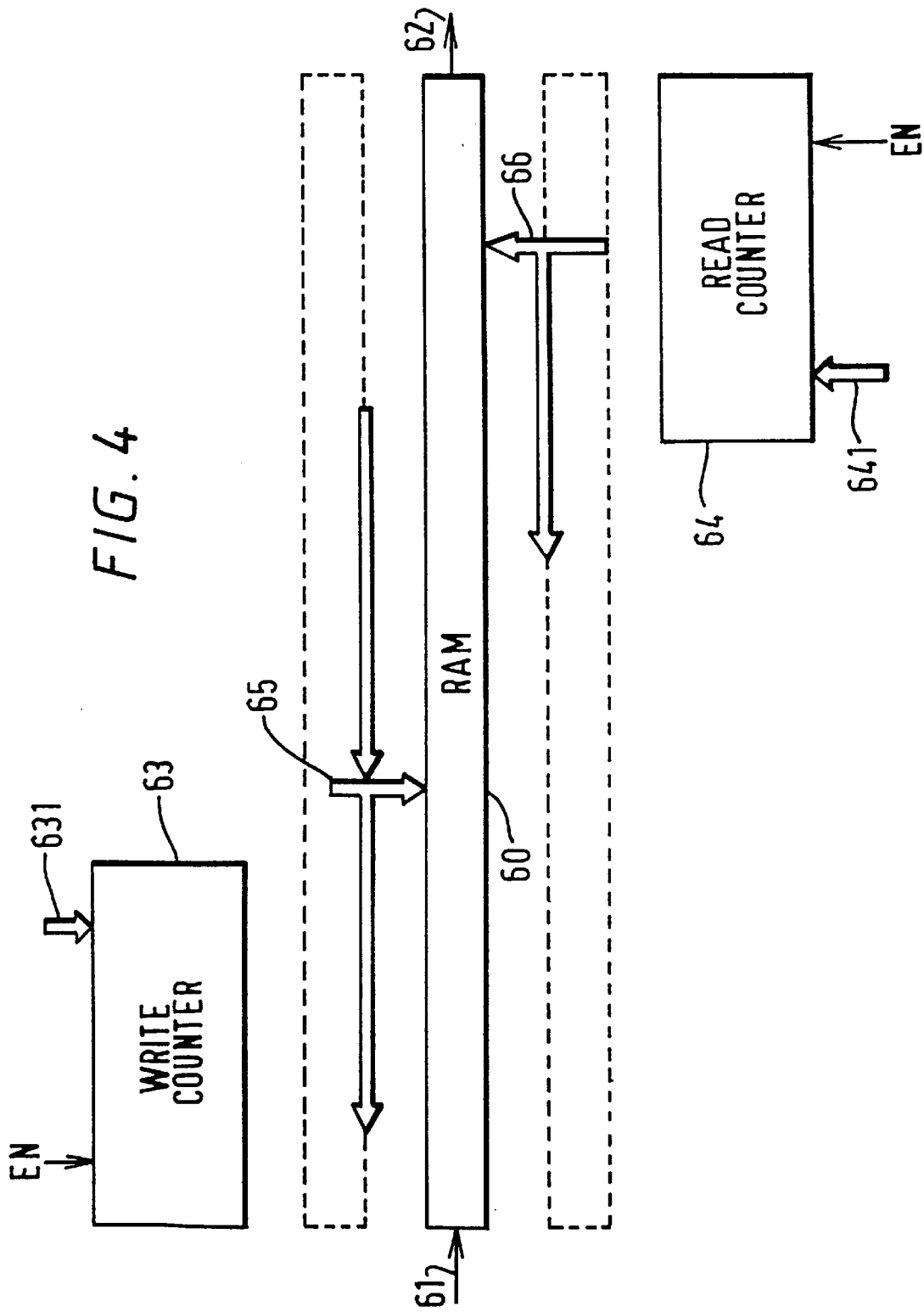
FIG. 4 is a schematic diagram illustrating the operation of a RAM organised as a FIFO as used in the processor of FIG. 1.

Referring to FIG. 4, a RAM organised as FIFO is shown to further explain the operation of the FIFOs 3, 7 and 12 in the processor of FIG. 1. The RAM 60 has a data input 61, a data output 62, a write counter 63 and a read counter 64. The write counter sequentially produces write addresses at which successive data samples at the input 61 are stored. Likewise the read counter sequentially produces read addresses to read the data samples stored at the addresses. The write and read counters successively address all the addresses as indicated by the write arrow 65 representing a write pointer and the read arrow 66 representing a read pointer.

In the case of the FIFO 3 in the processor of FIG. 1, the count of the write counter 63 is increased upon the occurrence of each audio sample under the control of the audio extract circuit 2, the sync signal of the audio extract circuit being applied to input 631 of the counter 63. The count of the read counter 64 is increased each time the filter control circuit 6 requires a new sample to be available, the filter control circuit applying a request signal to input 641 of counter 64.

Figure 6:
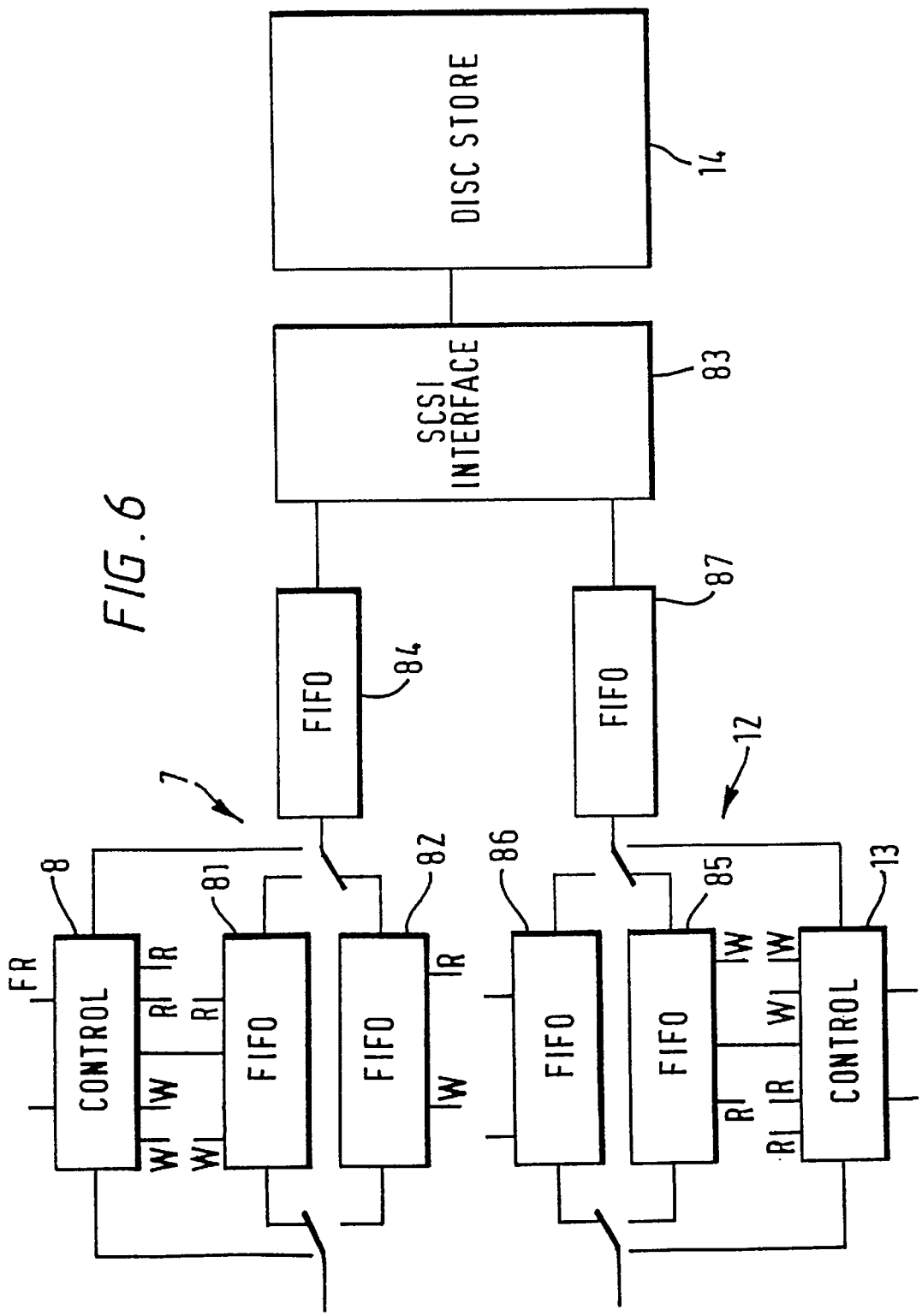
FIG. 6 is a schematic diagram of the apparatus of FIG. 1 for storing and reproducing audio data.

Referring to FIG. 6, the write circuit comprises two FIFO circuits 81 and 82 controlled by a control circuit 8 each having 400 storage cells. One channel of 400 audio samples per frame are delivered to the FIFO circuits 81 and 82. In known manner, as one frame of samples is being written into one of the FIFO circuits (e.g. 81) at 12 KHz, the preceding frame of samples is read out of the other FIFO circuit (82). On the next frame, the roles of the FIFO circuits are reversed. In this embodiment the frame of audio samples is read out at 1.6875 MHz and is thus time compressed.

The control circuit 8 operates to write only 400 samples per frame into the FIFO circuits 81 and 82. Thus one sample is dropped from those frames having 401 samples.

The time compressed samples read out of the FIFO circuits 81 and 82 are delivered to a SCSI interface 83 by another FIFO 84 acting as a buffer store to allow the rate of production of data by the FIFO circuits 81 and 82 to match the data transfer rate of the SCSI interface the data rate of other data recorded on the disc.

The read circuit 12 has the same construction as the write circuit 7. Time compressed audio samples are reproduced from the disc store and delivered to FIFO circuits 85 and 86 via the SCSI interface 83 and a FIFO buffer 87. Under the control of control circuit 13 the time compressed audio samples of one frame are written into one (e.g. 86) of the FIFO circuits whilst the previous frame of audio samples are read out decompressed at 12 KHz. On the next frame the roles of the FIFO circuits are reversed.

The control circuit 13 causes 400 samples per frame to be made available at the output of the read circuit once the 400th sample is available at the output, it remains there until the next write cycle. Thus in those frame intervals where there are 401 audio samples, the 400th sample is available to be read twice by the circuit which uses the samples.

Figure 5A:
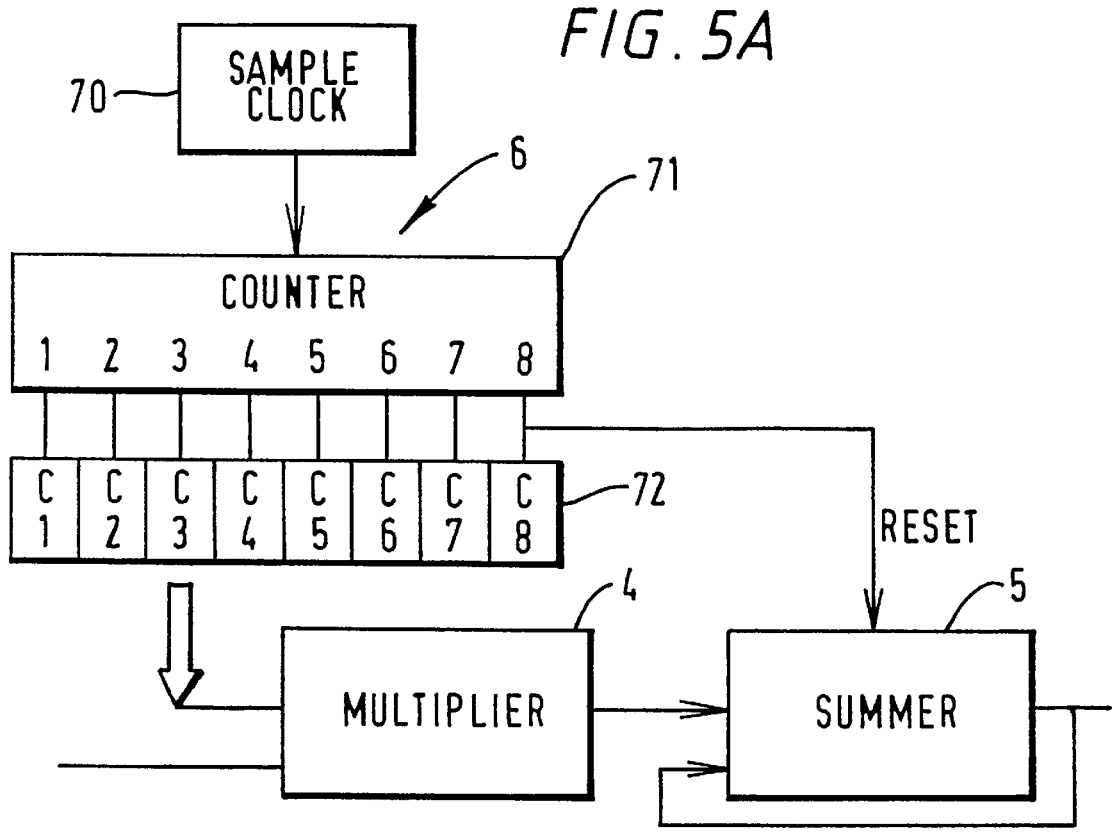
FIGS. 5A and 5B are schematic diagram of the filter control, multiplier and accumulator of the processor of FIG. 1.

Referring to FIGS. 5 and 3, the audio samples have a sample rate of 12K samples/second. Groups of g samples are weighted and summed serially in one period of 48 KHz. In FIG. 5 it is assumed for ease of illustration g=8.

A sample clock 70 operating at g×48 KHz provides clock pulses which are counted by a modulo-8 counter 71. The counter 71 sequentially selects 8 coefficients stored in a RAM 72. The read counter 64 of the FIFO 3 is incremented by each clock pulse to read successive samples which are multiplexed in the multiplier 4 by the weighting coefficients. The summer 5 sequentially sums each weighted coefficient from the multiplier 4 with the current sum in the summer. After g samples have been weighted the summer is reset in response to the count g=8 of the counter.

Once the g samples have been weighted and added the read pointer is moved to read another group of g samples displaced by e.g. h=4 samples from the beginning of the previous group.

Figure 5B:
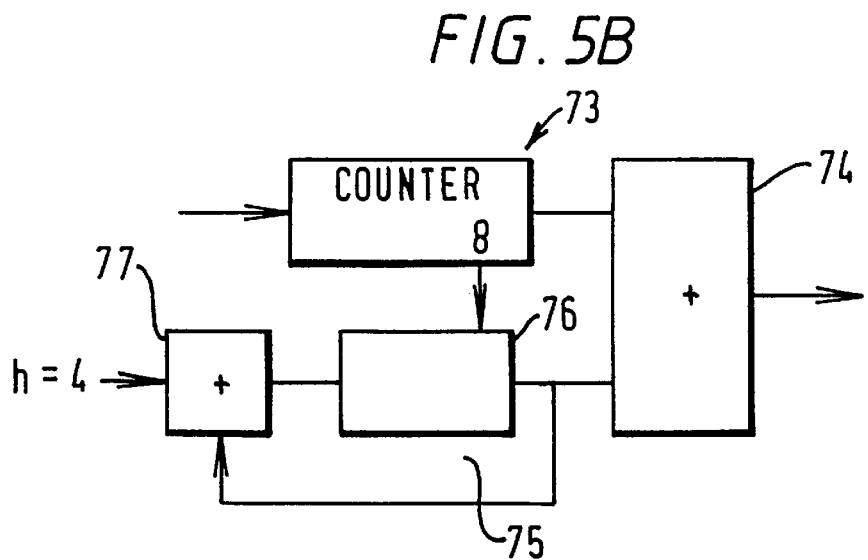

As shown in FIG. 5B, for this purpose the filter control 6 includes a read address generator for generating the read addresses for FIFO 3. The generator comprises the modulo-8 counter 71, an adder 74 and an accumulator 75 comprising a store 76 and an adder 77 which receives at one input a set count of h=4. The counter 71 counts the sample clock pulses from the clock 70. The accumulator store 76 initially contains a count of 0. The adder 74 produces the count of the counter 71 plus the count in store 76. When the counter of counter 71 reaches g=8, the store 76 is enabled to received the sum of its contents plus 4 from the adder 77. (It will be recalled that the contents of summer 5 also are reset when the count of counter 71 reaches g=8.) Thus a sequence of g=8 samples are read from the FIFO 3 and weighted and summed. When the count g=8 occurs the count in the store 76 increases to 4. A new sequence of g=8 samples are then read from the FIFO 3 beginning with address 4. At the next count of g=8, the count in the store 76 increases to 8. In this way each group of g samples is successively displaced from its preceding group.

Although it has been assumed for ease of illustration g=8, in practice g and the magnitudes of the weighting coefficients are determined in known manner by the desired filter characteristic: g may be 31 for example, defining a symmetrical FIR filter characteristic.

For ease of explanation and illustration it has been assumed that there is only one channel of audio. There may be more than one channel of audio, for example 2 or 4 channels. In that case, the channels are sample-multiplexed. The sample clock 70 is then increased in frequency by the number of channels and one set of weighting coefficients is provided for each channel.

The 4 channels of audio samples are delivered to the disc write circuit at 48 KHz and time compressed to a sample rate of 6.75 MHz.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing digital audio data comprising:

a source of digital audio data representing audio data samples at an audio data sampling rate, the audio data samples being arranged in groups spaced in time, the data in a group having a data rate much greater than the audio data sampling rate;

a first in first out store;

write control means for writing the samples of each group into the first in first out store at the said data rate as the group is produced by the source;

read control means for reading sets of a predetermined number of successive samples from the first in first out store at a rate corresponding to the audio data sampling rate and means for weighting the respective samples of each set and for summing the weighted samples of the set to produce filtered audio data at the audio data sampling rate;

each set of samples read out from the first in first out store being displaced by a preset number of samples relative to the previous set to decimate the audio data.

2. Apparatus according to claim 1, wherein the digital audio data is embedded in digital video data and the said data rate corresponds to a video data sampling rate, and the said source comprises means for extracting the audio data from the video data.

3. Apparatus according to claim 1, wherein the read control means reads the successive samples of each set from the first in first out store serially in time.

4. Apparatus according to claim 3, wherein the means for weighting comprises means for producing weighting factors for the successive samples serially in time synchronously with the operation of the read control means.

5. Apparatus according to claim 4, wherein the means for weighting further comprises an accumulator for adding the weighted samples serially in time and means for resetting the accumulator after the said predetermined number of samples have been summed.

* * * * *